UNITED STATES PATENT OFFICE.

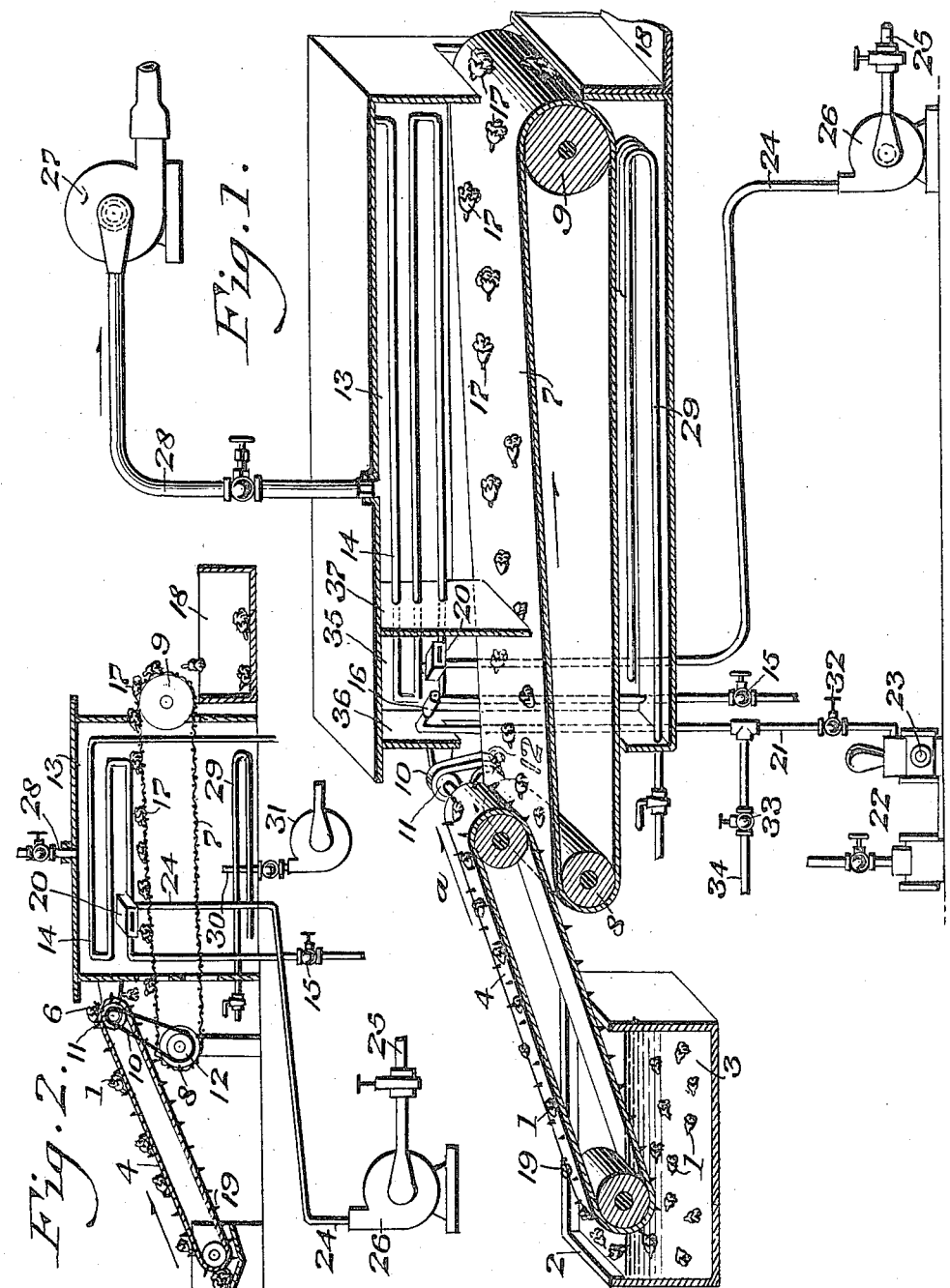

JOHN ELLWOOD LEE, OF CONSHOHOCKEN, PENNSYLVANIA, ASSIGNOR TO JOHN B. HALL, OF PHILADELPHIA, PENNSYLVANIA.

PROCESS FOR MATURING IMMATURE AND FROST-BITTEN COTTON-BOLLS.

1,166,060. Specification of Letters Patent. Patented Dec. 28, 1915.

Original application filed December 5, 1912, Serial No. 735,024. Divided and this application filed May 28, 1913. Serial No. 770,387.

*To all whom it may concern:*

Be it known that I, JOHN ELLWOOD LEE, a citizen of the United States, residing at Conshohocken, in the county of Montgomery, State of Pennsylvania, have invented a new and useful Process for Maturing Immature and Frost-Bitten Cotton-Bolls, of which the following is a specification.

In a contemporaneously pending application, filed by me December 5th, 1912, Serial No. 735,024, and patented Sept. 23rd, 1913, #1,073,914, I have shown, described and claimed a novel apparatus for maturing immature and frost-bitten cotton bolls, of which the present application is a division, my present invention relating to a novel process for maturing immature and frost bitten cotton bolls, whereby I am enabled to utilize such bolls which have failed to open by reason of an early frost, or by reason of any other causes which tend to promote an unduly late growth of cotton, under which conditions the cotton is liable to be caught by frost, and a large number of the bolls fail to open, such bolls and the cotton therein having heretofore not been utilized under past conditions, since they have no commercial value whatever, as their only value at present is when plowed under in sufficient quantities, they act to fertilize the soil if there are very many on the land.

By my invention, I am enabled after said immature, unopened or frost bitten cotton bolls are gathered, to chemically treat the same in a novel maturing chemical solution or alkaline bath or by spraying or dusting the bolls, and then preferably automatically transferring them through a suitable moisture extracting apparatus of the desired proportions, and provided with one or more aprons or a plurality of compartments, if desired, wherein said bolls are subjected to the desired temperature, provision being made for injecting an additional quantity of the chemical or alkaline maturing solution or chemical powder or dust, which I employ and which I term broadly a maturing composition, into the interior of the moisture extracting chamber upon said bolls during their progress therethrough, whereby the work of maturing the same may be expedited, if so desired.

By my novel process, I am enabled to take all heretofore useless and apparently dead frost bitten, unopened or immature cotton bolls and treat the same with the chemicals either used dry or in solution, as hereinafter referred to, and thereafter dry said bolls so that they will be opened in a few hours' time subsequent to my novel treatment, thereby enabling the cotton contained therein to be readily removed for the purposes of ginning or subsequent treatment, my novel invention resulting in reclaiming for the cotton planter, a large proportion of a most valuable article of commerce that is now allowed to go absolutely to waste, and, in addition, I assist in the extermination of the pest known as the cotton boll-weevil by my utilization of the immature or unopened cotton bolls in which said weevil has heretofore lodged, and I am also enabled by my novel process to increase the production of an important staple article of commerce, which is constantly increasing in value and demand.

The ingredients employed in carrying out my process are cheap and inexpensive chemicals, such as caustic soda, potash, lime or ammonia, combined with water, about five to twenty per cent. of either or all of the foregoing ingredients being combined with water to produce what I term broadly an alkaline bath or maturing solution, or, if desired, either of said chemicals can be used in the dry state and the cotton bolls can either be saturated with this alkaline maturing solution or a powder of the same may be dusted in a dry state directly upon the immature, unopened or frost bitten bolls.

In practice, I prefer to strip the bolls from their stalks while in immature condition, and I am thus enabled to use any and all bolls immature or unopened on a cotton stalk plant, which can be quickly and expeditiously gathered at the same time, the bolls being subsequently and expeditiously treated by my novel process.

To the above ends, my invention consists of a novel process of treating immature, unopened or frost bitten cotton bolls, comprising as its first step, the saturation or immersion of such bolls in a chemical solution composed of water, combined with any or all of the following chemicals, such as caustic soda, potash, lime or ammonia, said chemicals being combined in proportions of about five to twenty per cent. After saturating said bolls in said chemical or maturing solution, I thereafter dry them, preferably by the application of artificial heat thereto, whereby I am enabled to produce artificially a condition which would be produced by nature if all atmospheric and climatic conditions were perfect or favorable.

For the purpose of illustrating my invention, I have shown one form of apparatus wherein the steps of my novel process may be carried out, but it will be understood that the maturing solution or powder may be applied in a different manner, and different mechanisms from that shown may be employed, and I do not therefore desire to be limited to any particular mechanism for carrying out the steps of my invention, and furthermore, the proportions of the ingredients employed for the maturing composition or alkaline solution or both, may be varied, according to requirements, under atmospheric or climatic conditions, or the conditions of the bolls themselves.

Figure 1 represents a diagrammatic view of one form of apparatus for carrying out the novel steps of my process for maturing immature, unopened or frost bitten cotton bolls, it being understood that the broad embodiments of my invention may be carried out in any other suitable form of apparatus other than that shown, and the sequence of the steps of my novel process may also be varied, if desired. Fig. 2 represents a diagrammatic view of a form of apparatus for applying the maturing composition in powder form only.

In carrying out my invention, I first gather the immature, unopened or frost bitten cotton bolls 1, and place them in a suitable tank or receptacle, 2, in which is contained a bath or solution 3 of any maturing alkaline liquid, such as either caustic soda, potash, lime or ammonia or other suitable alkali or chemical taken singly or combined in the proportions of about five to twenty per cent. of each to sufficient water or other liquid to hold the same in solution, and this bath 3, which I herein broadly term a maturing solution or alkaline bath, is contained within the tank 2, and in this bath I first immerse the immature, unopened or frost bitten cotton bolls, pods or the like, 1. If desired, I may use the maturing chemicals in a dry state, dusting them onto the bolls.

4 designates an endless slowly driven drying apron or equivalent device, which passes around the rollers 5 and 6, which may be sprocket wheels or similar devices, and is actuated from any suitable source of power, the roller 5 being preferably partly immersed in the bath 3, so that a portion of the endless apron 4 may travel therein, said apron being caused to travel in the direction of the arrow $a$, and being provided with projections 19 thereon to engage and propel the saturated cotton bolls.

7 designates an endless moisture extracting apron or carrier, which travels around the rollers 8 and 9, the latter being caused to rotate by the sprocket chain or belt 10, which is driven by the sprocket wheels 11 and 12, mounted on the shafts which carry the rollers 6 and 8 respectively. The moisture extracting apron 7 receives the cotton bolls 1 after their immersion in the bath 3, and their removal therefrom by the feeding or propelling apron 4, and carries them at a very slow rate of speed through the moisture extracting chamber 13, whose interior is heated to the desired extent by any suitable means, as the steam or other pipes 14, the temperature or amount of steam therein being controlled by the valve 15. When desirable or necessary, I further treat the cotton bolls during their passage through the moisture extracting chamber 13, by subjecting them to an additional sprinkling action of a dust through the nozzle or nozzles 20, said dust being composed of the alkaline chemicals as herein before mentioned as composing the bath 3, and said dust or powder jets being injected into a compartment in the interior of the moisture extracting chamber arranged for the purpose so as not to affect the whole moisture extracting chamber, and said dust being injected directly upon the bolls through said nozzle or nozzles 20. This permits double treatment of the bolls if necessary. Either point of treatment can be omitted if the bolls are in such condition that one treatment readily causes them to open.

In my present invention, I have shown a supply pipe 25 for the conveyance of the maturing dust or composition to the pipe 24, said maturing dust being propelled to the nozzle or nozzles 20 by means of the fan blower or equivalent device 26. When it is desirable or necessary, I may subject the cotton bolls to the action of a spray through the nozzle or nozzles 16, said spray being composed of the same alkaline chemical or chemicals in solution as herein before mentioned as composing the bath 3, said spray being injected into a compartment in the interior of the moisture extracting chamber arranged for the purpose so as not to affect the whole moisture extracting chamber and being injected into the nozzle or nozzles 16 by means of the pump 22 having the discharge pipe 21 leading to said nozzle or nozzles 16, the alkaline solution being conducted to said pump through the pipe 23.

17 designates the cotton bolls shown as being opened or matured by the preceding herein before described steps of my process and in the act of leaving the apron 7, and being received in any suitable receptacle 18, wherefrom they may be removed for the subsequent steps of ginning or other treatment. It will be understood that the apron 7 travels very slowly in the moisture extracting chamber 13, and that the latter may be made of any suitable length and any number of aprons may be employed, arranged one above the other and overlapping one another and running in reverse directions so that the top apron will drop the bolls on the one below, which will return them to the feed end of the machine, which in turn drops them on an apron, which again returns them to the opposite end of the machine and so on until the operation is completed.

I have in the present instance shown but a single apron, as my process can be efficiently carried out therewith, but I desire it understood that I may employ a plurality of aprons, as above explained, if desired, in order to subject the cotton bolls during their travel through the moisture extracting chamber, to the desired temperature and for the proper period of time, so as to enable the maturing to be effected without injuring the fiber or the bolls.

The operation is as follows: The cotton bolls or the like, after being first immersed in the bath 3, for the requisite time, are propelled or fed therefrom by the apron 4, until they drop upon the moisture extracting apron 7, whereupon they are slowly fed through the moisture extracting chamber 13, the effect of which is to cause the immature or unopened bolls to open by the application of the heat thereto, and I thus produce artificially a condition approximating fruition, which would be produced by nature under perfect climatic or atmospheric conditions. It will be understood that if desired, I may omit the moisture extracting step of my process and merely immerse the immature or frost bitten bolls in the alkaline bath or chemical solution 3, or I may spray or dust said chemical solution or alkaline bath 3 on said bolls, and allow the moisture extracting of the latter to take place under ordinary atmospheric conditions and without the application of extraneous heating devices, as the moisture extracting chamber 13 and it adjuncts. I may take nearly mature but wholly unopened bolls from a cotton field, and by my treatment turn them into a better grade of cotton than the average would be in case they were let to ripen in the field, for the reason that all cotton bolls opening in the field are subjected to heavy dews, dust, rain and wind, from which damage the unopened bolls escape.

I am therefore enabled by my novel process to utilize all the frost bitten, unopened or immature cotton bolls, which under present conditions are allowed to dry upon the stalks or fall to the ground, and afford a home or place of lodgment for the boll-weevil and its larva, and I am further enabled by my process of utilizing immature, unopened or frost bitten cotton bolls, which have heretofore not been utilized, to assist in the elimination of the destructive pest of the boll-weevil, and I am in addition enabled not only to utilize frost bitten, unopened and immature cotton bolls, but also the cotton and cotton seed therein, which have heretofore been wasted and not utilized. The seeds of the immature or frost bitten cotton bolls which have heretofore gone to waste, are, according to chemical tests which I have had made, as well adapted for cotton seed oil as the seed of bolls matured in the usual way, except that there is less production of oil to the bushel, as compared to the oil production from seeds of the matured bolls. The fiber or lint or celluloid or smokeless powder products obtained from the immature bolls treated by my process are equally as valuable as those from the matured bolls, and the basis for smokeless powder is greatly increased, so that in case of a prolonged war, an indefinitely greater supply would be on hand, ready for emergency than has heretofore been the case.

The operation of the apparatus is entirely automatic and several machines can be regulated or operated by a single attendant, the power being applied initially to either of the shafts or sprocket wheels 11 and 12.

In the broad aspect of my invention, I do not desire to be limited to any particular kind of maturing solution, although I have specified alkaline solutions which may be employed.

It will be apparent that, if desired, I may employ a plurality of moisture extracting chambers arranged in proximity to each other, instead of the single moisture extracting process which I have shown, as under some conditions of bolls and some climatic or atmospheric conditions, it may be necessary to give the bolls or the like a second or a third treatment while going through the moisture extracting process in order to make them open properly and expeditiously, and while I have shown one form of process in which my invention may be carried out and have described certain preferred steps of my process, I do not desire to be limited thereto in every instance as the sequence of the steps of my process may be changed, if desired, and certain of the steps may be omitted, without departing from the scope of my invention.

When desirable or necessary, I may employ either a vacuum creating or exhausting device for the top of the moisture extracting chamber for the purpose of removing the gases or moisture therefrom, or, if desired, I may employ cooling pipes located in the bottom of the moisture extracting chamber for causing condensation of gases or moisture therein. The exhausting device is illustrated as an exhaust fan, 27, communicating with the moisture extracting chamber by a pipe, 28, through which gases or moisture are extracted from the moisture extracting chamber. The cooling pipes, 29, condense such moisture or gases.

In the form of apparatus illustrated in Fig. 2 of the drawings, the maturing composition is applied in powder form through the nozzle 20, and the moisture extracting apron is disclosed as consisting of a fabric such as wire-cloth.

In the construction seen in Fig. 2, I do not initially saturate the cotton bolls in the bath 3, the same being merely propelled upon the moisture extracting apron 7 by any suitable means, and as said moisture extracting apron slowly travels through the moisture extracting chamber, I dust or blow the alkaline or maturing powder hereinbefore described upon the immature or unopened bolls through the nozzle 20, the heat or temperature within the moisture extracting chamber being regulated by the valve 15, controlling the pipe 14.

In the construction seen in Fig. 2, I employ a cold water pipe 29, if desired, or the same may be omitted, and I may employ the pipe 30 having the suction device 31, the operation of the suction device or fan 31 being to withdraw any of the excess gases downwardly through the moisture extracting chamber and out from the bottom thereof, the pipe 28 being provided with a suitable valve, if desired, and leading directly to the atmosphere.

In the construction seen in Fig. 1, I may, if desired, close the valve 32 and open the valve 33 in the pipe 34, which latter leads to the pipe 21, said pipe 34 being connected with a source of steam supply, as live or exhaust steam, whereupon upon closing the valve 32 and opening the valve 33, I am enabled to inject live or exhaust steam through the nozzle 16 directly upon the immature or unopened bolls contained within the chamber 35 formed between the wall 36 of the moisture extracting chamber and the partition 37, the latter terminating a short distance above the endless apron 7.

It will of course be understood that while I have shown the moisture extracting chamber in Fig. 1 as being broken away for the purposes of illustration, the same in practice completely incloses the moisture extracting apron and the steam pipes, nozzles 16 and 20, and other adjuncts, in order to heat the bolls to the desired temperature during the moisture extracting operation. It may be desirable, in some instances, in the place of using the maturing powder which is applied to the bolls through the nozzle 20, or maturing solution which is applied through the nozzle 16, to merely close the valve 32 and open the valve 33 and inject live or exhaust steam upon the bolls contained within the chamber 35, the immature or unopened bolls being thus initially treated by steam alone within the compartment 35, and thereafter caused to open during their travel through the moisture extracting chamber, according to the condition of the bolls to be treated.

It will of course be understood that while I have shown the exhaust fan 27 and the pipe 28 connected with the top of the moisture extracting chamber in the construction seen in Fig. 1, the same may be connected to the bottom thereof, if desired.

It will be understood that the apron 4 travels very slowly, the tendency of which is to initially extract or drain some of the moisture from the cotton bolls during the movement of said apron.

While I have described my invention as applicable to bolls which are immature or frost bitten and turned brown, in which case they have a hard shell on them something like the hull of a hickory nut, I desire to lay emphasis upon the fact that by my novel process, cotton bolls which are practically mature but unopened, if picked a few days before they burst, and subjected to my process, will furnish much whiter, cleaner and better cotton than can possibly be obtained by allowing them to burst open naturally in the field, said cotton produced by my process being obviously of much greater value and commanding a higher price than cotton obtained from the bolls which are allowed to burst naturally in the field, in which case the cotton is subjected to dews at night and rain and dust whenever the wind blows.

It will be obvious to those skilled in the art that prior to the time a boll bursts, it is practically sealed in a substantially airtight container and is protected from dust and the elements. Consequently, the cotton procured by my process from unopened bolls which are nearly ripe but picked a few days before they burst open, is greatly superior to cotton procured from bolls which have been allowed to open in the natural way, and in the broad aspects of my invention and in the application of my process, I desire it understood that the same is applicable to cotton bolls which are nearly ripe and practically mature but unopen, as well as the bolls which are immature and frost bitten.

Having thus described my invention, what I claim as new and desire to secure by Letters Patent, is:—

1. The herein described process of maturing mature but unopened and immature, unopened or frost bitten cotton bolls, which consists in first applying maturing chemicals to said bolls, and next extracting the moisture from said bolls.

2. The herein described process of maturing immature, unopened or frost bitten cotton bolls, which consists in first wetting said bolls with an alkaline solution, and next extracting the moisture from said bolls, thereby causing the latter to dry out and burst open artificially.

3. The herein described process of maturing immature, unopened or frost bitten cotton bolls, which consists in first immersing said bolls in an alkaline bath, and next subjecting said bolls to a drying action.

4. The herein described process of maturing immature, unopened or frost bitten cotton bolls, which consists in first applying maturing chemicals to said bolls, next subjecting said bolls to a gradual drying action, and lastly applying additional maturing chemicals to said bolls during said drying action.

5. The herein described process of maturing immature, unopened or frost bitten cotton bolls, which consists in first immersing said bolls in an alkaline bath, next subjecting said bolls to a drying action, and lastly applying additional maturing chemicals to said bolls during said drying action.

6. The herein described process of maturing immature, unopened or frost bitten cotton bolls, which consists in first applying maturing chemicals to said bolls, next subjecting said bolls to a drying action, and withdrawing gases or moisture from said bolls during the drying action.

7. The herein described process of maturing immature, unopened or frost bitten cotton bolls, which consists in first applying maturing chemicals or an alkaline solution to said bolls, next subjecting said bolls to a gradual drying action, next applying additional maturing chemicals to said bolls during said drying action, and lastly effecting the withdrawal of gases or moisture from said bolls during said drying action.

8. The herein described process of maturing immature, unopened or frost bitten cotton bolls, which consists in first applying steam to said bolls, and next subjecting said bolls to a gradual drying action.

9. The herein described process of maturing immature, unopened or frost bitten cotton bolls, which consists in first applying steam to said bolls, next subjecting said bolls to a gradual drying action, and withdrawing gases or moisture from said bolls during the drying action.

JOHN ELLWOOD LEE.

Witnesses:
C. D. McVay,
M. E. Byrne.

Copies of this patent may be obtained for five cents each, by addressing the "Commissioner of Patents, Washington, D. C."